(12) United States Patent
Vorbach et al.

(10) Patent No.: US 6,542,998 B1
(45) Date of Patent: Apr. 1, 2003

(54) METHOD OF SELF-SYNCHRONIZATION OF CONFIGURABLE ELEMENTS OF A PROGRAMMABLE MODULE

(75) Inventors: Martin Vorbach, Karlsruhe (DE); Robert Münch, Karlsruhe (DE)

(73) Assignee: PACT GmbH, Munich (DE)

( * ) Notice: Subject to any disclaimer, the term of this patent is extended or adjusted under 35 U.S.C. 154(b) by 0 days.

(21) Appl. No.: 09/369,653

(22) Filed: Aug. 6, 1999

Related U.S. Application Data

(63) Continuation-in-part of application No. PCT/DE98/00334, filed on Feb. 7, 1998, which is a continuation-in-part of application No. 08/946,812, filed on Oct. 8, 1997, now Pat. No. 6,081,903.

(30) Foreign Application Priority Data

Feb. 8, 1997 (DE) .......................... 197 04 728

(51) Int. Cl.[7] .............................................. G06F 13/00
(52) U.S. Cl. .......................................... 713/400; 713/1
(58) Field of Search ................................ 713/400, 401, 713/1

(56) References Cited

U.S. PATENT DOCUMENTS

| | | |
|---|---|---|
| 4,591,979 A | 5/1986 | Iwashita |
| 4,706,216 A | 11/1987 | Carter |
| 4,739,474 A | 4/1988 | Holsztynski et al. |
| 4,761,755 A | 8/1988 | Ardini et al. |
| 4,811,214 A | 3/1989 | Nosenchuck et al. |
| 4,852,048 A | 7/1989 | Morton |
| 4,870,302 A | 9/1989 | Freeman |
| 4,901,268 A | 2/1990 | Judd |
| 4,967,340 A | 10/1990 | Dawes |
| 5,014,193 A | 5/1991 | Garner et al. |
| 5,015,884 A | 5/1991 | Agrawal et al. |
| 5,021,947 A | 6/1991 | Campbell et al. |
| 5,023,775 A | 6/1991 | Poret |
| 5,043,978 A | 8/1991 | Nagler et al. |
| 5,081,375 A | 1/1992 | Pickett et al. |
| 5,109,503 A | 4/1992 | Cruickshank et al. |
| 5,113,498 A | 5/1992 | Evan et al. |
| 5,115,510 A | 5/1992 | Okamoto et al. |
| 5,123,109 A | 6/1992 | Hillis |
| 5,125,801 A | 6/1992 | Nabity et al. |
| 5,128,559 A | 7/1992 | Steele |
| 5,142,469 A | 8/1992 | Weisenborn |
| 5,204,935 A | 4/1993 | Mihara et al. |

(List continued on next page.)

FOREIGN PATENT DOCUMENTS

| | | |
|---|---|---|
| DE | 4416881 | 5/1993 |
| DE | 19654595 | 7/1998 |
| DE | 19654846 | 7/1998 |

(List continued on next page.)

OTHER PUBLICATIONS

Tau, Edwards, et al., "A First Generation DPGA Implementation," FPD'95, pp. 138–143.

(List continued on next page.)

Primary Examiner—Thomas M. Heckler
(74) Attorney, Agent, or Firm—Kenyon & Kenyon

(57) ABSTRACT

A method which permits self-synchronization of elements to be synchronized. Synchronization is neither implemented nor managed by a central entity. By shifting synchronization into each element, more synchronization tasks can also be performed simultaneously, because independent elements no longer interfere with one another when accessing the central synchronization entity. In a module with a two- or multi-dimensionally arranged programmable cell structure, each configurable element can access the configuration and status register of other configurable elements over an interconnecting structure and thus can have an active influence on their function and operation. The configuration can thus be accomplished by a load logic from a processing array.

39 Claims, 11 Drawing Sheets

U.S. PATENT DOCUMENTS

| | | |
|---|---|---|
| 5,208,491 A | 5/1993 | Ebeling et al. |
| 5,226,122 A | 7/1993 | Thayer et al. |
| RE34,363 E | 8/1993 | Freeman |
| 5,233,539 A | 8/1993 | Agrawal et al. |
| 5,247,689 A | 9/1993 | Ewert |
| 5,287,472 A | 2/1994 | Horst |
| 5,301,284 A | 4/1994 | Estes et al. |
| 5,301,344 A | 4/1994 | Kolchinsky |
| 5,303,172 A | 4/1994 | Magar et al. |
| 5,336,950 A | 8/1994 | Popli et al. |
| 5,347,639 A | 9/1994 | Rechtschaffen et al. |
| 5,361,373 A | 11/1994 | Gilson |
| 5,410,723 A | 4/1995 | Schmidt et al. |
| 5,418,952 A | 5/1995 | Morley et al. |
| 5,421,019 A | 5/1995 | Holsztynski et al. |
| 5,422,823 A | 6/1995 | Agrawal et al. |
| 5,426,378 A | 6/1995 | Ong |
| 5,430,687 A | 7/1995 | Hung et al. |
| 5,440,245 A | 8/1995 | Galbraith et al. |
| 5,440,538 A | 8/1995 | Olsen et al. |
| 5,442,790 A | 8/1995 | Nosenchuck |
| 5,444,394 A | 8/1995 | Watson et al. |
| 5,448,186 A | 9/1995 | Kawata |
| 5,455,525 A | 10/1995 | Ho et al. |
| 5,457,644 A | 10/1995 | McCollum |
| 5,465,375 A | 11/1995 | Thepaut et al. |
| 5,473,266 A | 12/1995 | Ahanin et al. |
| 5,473,267 A | 12/1995 | Stansfield |
| 5,475,583 A | 12/1995 | Bock et al. |
| 5,475,803 A | 12/1995 | Stearns et al. |
| 5,475,856 A | 12/1995 | Kogge |
| 5,483,620 A | 1/1996 | Pechanek et al. |
| 5,485,103 A | 1/1996 | Pedersen et al. |
| 5,485,104 A | 1/1996 | Agrawal et al. |
| 5,489,857 A | 2/1996 | Agrawal et al. |
| 5,491,353 A | 2/1996 | Kean |
| 5,493,239 A | 2/1996 | Zlotnick |
| 5,497,498 A | 3/1996 | Taylor |
| 5,506,998 A | 4/1996 | Kato et al. |
| 5,510,730 A | 4/1996 | El Gamal et al. |
| 5,511,173 A | 4/1996 | Yamaura et al. |
| 5,513,366 A | 4/1996 | Agarwal et al. |
| 5,521,837 A | 5/1996 | Frankle et al. |
| 5,522,083 A | 5/1996 | Gove et al. |
| 5,532,693 A | 7/1996 | Winters et al. |
| 5,532,957 A | 7/1996 | Malhi |
| 5,535,406 A | 7/1996 | Kolchinsky |
| 5,537,057 A | 7/1996 | Leong et al. |
| 5,537,601 A | 7/1996 | Kimura et al. |
| 5,541,530 A | 7/1996 | Cliff et al. |
| 5,544,336 A | 8/1996 | Kato et al. |
| 5,548,773 A | 8/1996 | Kemney et al. |
| 5,555,434 A | 9/1996 | Carlstedt |
| 5,559,450 A | 9/1996 | Ngai et al. |
| 5,561,738 A | 10/1996 | Kinerk et al. |
| 5,570,040 A | 10/1996 | Lytle et al. |
| 5,583,450 A | 12/1996 | Trimberger et al. |
| 5,586,044 A | 12/1996 | Agrawal et al. |
| 5,587,921 A | 12/1996 | Agrawal et al. |
| 5,588,152 A | 12/1996 | Dapp et al. |
| 5,590,345 A | 12/1996 | Barker et al. |
| 5,596,742 A | 1/1997 | Agarwal et al. |
| 5,617,547 A | 4/1997 | Feeney et al. |
| 5,634,131 A | 5/1997 | Matter et al. |
| 5,649,176 A | 7/1997 | Selvidge et al. |
| 5,652,894 A | 7/1997 | Hu et al. |
| 5,655,124 A | 8/1997 | Lin |
| 5,659,797 A | 8/1997 | Zandveld et al. |
| 5,713,037 A | 1/1998 | Wilkinson et al. |
| 5,717,943 A | 2/1998 | Barker et al. |
| 5,734,921 A | 3/1998 | Dapp et al. |
| 5,742,180 A | 4/1998 | Detton |
| 5,748,872 A | 5/1998 | Norman |
| 5,754,871 A | 5/1998 | Wilkinson et al. |
| 5,761,484 A | 6/1998 | Agarwal et al. |
| 5,778,439 A | 7/1998 | Timberger et al. |
| 5,794,059 A | 8/1998 | Barker et al. |
| 5,801,715 A | 9/1998 | Norman |
| 5,828,858 A | 10/1998 | Athanas |
| 5,838,165 A | 11/1998 | Chatter |
| 5,844,888 A | 12/1998 | Markkula, Jr. et al. |
| 5,854,918 A | 12/1998 | Baxter |
| 5,867,691 A | 2/1999 | Shiraishi |
| 5,892,961 A | 4/1999 | Trimberger et al. |
| 5,915,123 A | 6/1999 | Mirsky et al. |
| 5,927,423 A | 7/1999 | Wada et al. |
| 5,936,424 A | 8/1999 | Young et al. |
| 5,956,518 A | 9/1999 | DeHon et al. |
| 6,034,538 A | 3/2000 | Abramovici |
| 6,014,509 A | 4/2000 | Furtek et al. |
| 6,052,773 A | 4/2000 | DeHon et al. |
| 6,081,903 A | 6/2000 | Vorbach et al. |
| 6,054,873 A | 8/2000 | Laramie |
| 6,108,760 A | 9/2000 | Mirsky et al. |
| 6,122,719 A | 9/2000 | Mirsky et al. |
| 6,127,908 A | 10/2000 | Bozler et al. |
| 6,202,182 B1 | 3/2001 | Abramovici et al. |
| 6,243,808 B1 | 6/2001 | Wang |
| 6,282,627 B1 | 8/2001 | Wong et al. |
| 6,288,566 B1 | 9/2001 | Hanrahan et al. |
| 6,311,200 B1 | 10/2001 | Hanrahan et al. |
| 6,341,318 B1 | 1/2002 | Dakhil |
| 6,347,346 B1 | 2/2002 | Taylor |
| 6,349,346 B1 | 2/2002 | Hanrahan et al. |
| 6,370,596 B1 | 4/2002 | Dakhil |
| 6,389,579 B1 | 5/2002 | Phillips et al. |
| 6,392,912 B1 | 5/2002 | Hanrahan et al. |

FOREIGN PATENT DOCUMENTS

| | | |
|---|---|---|
| DE | 19704728 | 8/1998 |
| DE | 19651075 | 10/1998 |
| EP | 0 221 360 | 5/1987 |
| EP | 0428327 A1 | 5/1991 |
| EP | 748 051 A2 | 12/1991 |
| EP | 0539595 A1 | 5/1993 |
| EP | 0 678 985 | 10/1995 |
| EP | 0707269 A | 4/1996 |
| EP | 0726532 | 8/1996 |
| EP | 735 685 | 10/1996 |
| EP | 0748051 A2 | 12/1996 |
| EP | 0735685 | 10/1998 |
| WO | A9004835 | 5/1990 |
| WO | WO90/11648 | 10/1990 |
| WO | A9311503 | 6/1993 |
| WO | 94/08399 | 4/1994 |
| WO | 95/00161 | 1/1995 |
| WO | 95/26001 | 9/1995 |

OTHER PUBLICATIONS

Villasenor, John, et al., "Configurable Computing." *Scientific American*, vol. 276, No. 6, Jun. 1997, pp. 66–71.

Villasenor, John, et al., "Configurable Computing Solutions for Automatic Target Recognition," *IEEE*, 1996 pp. 70–79.

Athanas, Peter, et al., "IEEE Symposium on FPGAs For Custom Computing Machines," *IEEE Computer Society Press*, Apr. 19–21, 1995, pp. i–vii, 1–222.

Bittner, Ray, A., Jr., "Wormhole Run–Time Reconfiguration: Conceptualization and VLSI Design of a High Performance Computing system," *Dissertation*, Jan. 23, 1997, pp. i–xx, 1–415.

Myers, G., Advances in Computer Architecture, Wiley–Interscience Publication, 2nd ed., John Wiley & Sons, Inc. pp. 463–494, 1978.

M. Saleeba, "A Self–Contained Dynamically Reconfigurable Processor Architecture", Sixteenth Australian Computer Science Conference, ASCS–16, QLD, Australia, Feb., 1993.

M. Morris Mano, "Digital Design," by Prentice Hall, Inc., Englewood Cliffs, New Jersey 07632, 1984, pp. 119–125, 154–161.

Maxfield, C. "Logic that Mutates While–U Wait" EDN (Bur. Ed) (USA), EDN (European Edition), Nov. 7, 1996, Cahners Publishing, USA.

Norman, Richard S., Hyperchip Business Summary, The Opportunity, Jan. 31, 2000, pp. 1–3.

METHOD OF SELF-SYNCHRONIZATION OF CONFIGURABLE ELEMENTS OF A PROGRAMMABLE MODULE

This application is a continuation-in-part of PCT/DE98/00334, filed on Feb. 7, 1998 and of U.S. patent application Ser. No. 08/946,812 filed on Oct. 8, 1997 now U.S. Pat. No. 6,081,903, and claims the benefit of the priority date of these cases under 35 U.S.C. §120. This application also claims the benefit of the priority date of DE 197 04 728.9, filed on Feb. 8, 1997, under 35 U.S.C. §119.

BACKGROUND INFORMATION

Synchronization of configurable elements of today's modules, e.g., field programmable gate arrays ("FPGAs"), dynamically programmable gate arrays ("DPGAs"), etc., is usually accomplished using the clock of the module. This type of time-controlled synchronization poses many problems because it is often not known in advance how much time is needed for a task until a final result is available. Another problem with time-controlled synchronization is that the event on which the synchronization is based is not triggered by the element to be synchronized itself but rather by an independent element. In this case, two different elements are involved in the synchronization. This leads to a considerably higher administrative complexity.

European Patent No. 0 726 532 describes a method of controlling data flow in SIMD machines composed of several processors arranged as an array. An instruction is sent to all processors which dynamically selects the target processor of a data transfer. The instruction is sent by a higher-level instance to all processors (broadcast instruction) and includes a destination field and a target field. The destination field controls a unit in the processor element to dynamically determine the neighboring processor element to which the result is to be sent. The operand register of another processor element in which another result is to be stored is dynamically selected,with the target field.

SUMMARY

The present invention relates to a method which permits self-synchronization of elements to be synchronized. Synchronization is neither implemented nor managed by a central entity. By shifting synchronization into each element, more synchronization tasks can also be performed simultaneously, because independent elements no longer interfere with one another when accessing the central synchronization entity.

In accordance with an example embodiment of the present invention, in a module, e.g., a data flow processor ("DFP") or a DPGA, with a two- or multi-dimensionally arranged programmable cell structure, each configurable element can access the configuration and status register of other configurable elements over an interconnecting structure and thus can have an active influence on their function and operation. A matrix of such cells is referred to below as a processing array (PA). The configuration can thus be accomplished by a load logic from the PA in addition to the usual method.

DETAILED DESCRIPTION

Figure 1:
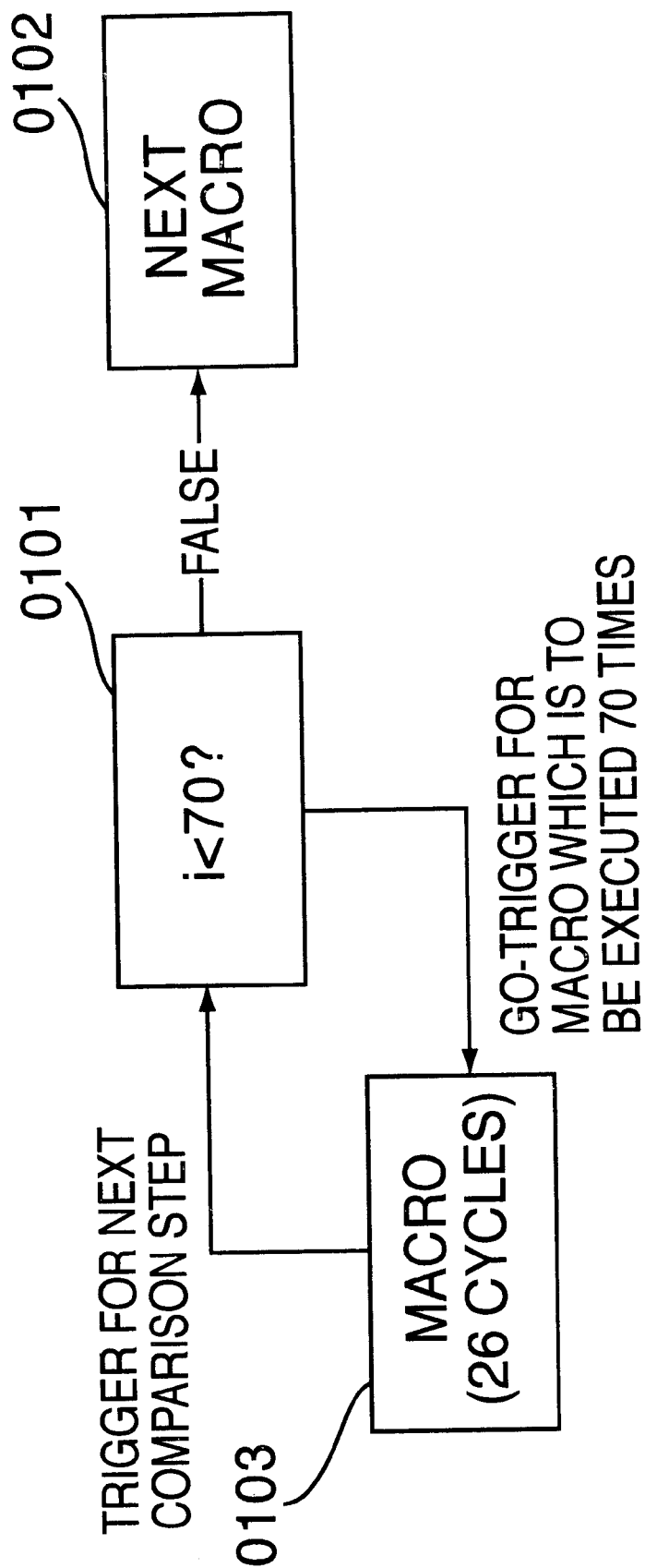
FIG. 1 shows how a loop construct can be implemented by using triggers, in accordance with an example embodiment of the present invention.

The present invention provides a module which is freely programmable during the running time and can also be reconfigured during the running time. Configurable elements on the chip have one or more configuration registers for different functions. Both read and write access to these configuration registers is permitted. In the method described here, it is assumed that a configuration can be set in an element to be configured for the following information.

Interconnection register. In this register, the type of connection to other cells is set.

Command register. The function of the configurable element to be executed is entered in this register.

Status register. The cell stores its instantaneous status in this register. This status provides other elements of the module with information regarding which processing cycle the cell is in.

A cell is configured by a command which determines the function of the cell to be executed. In addition, configuration data is entered to set the interconnection with other cells and the contents of the status register. After this operation, the cell is ready for operation.

To permit flexible and dynamic cooperation of many cells, each cell can have read or write access to all the configuration registers of another cell. Which of the many configuration registers is accessed by reading or writing is specified by the type of command with which the cell has been configured. Each command that can be executed by the cell exists in as many different types of addressing as there are different independent configuration registers in an element to be configured.

Example: A cell has the configuration register described above (interconnection, command and status) and is to execute the command ADD which performs an addition. It is then possible to select through the various types of ADD command where the result of this function is to be transferred.

ADD-A. The result is transferred to operand register A of the target cell.

ADD-B. The result is transferred to operand register B of the target cell.

ADD-V. The result is transferred to the interconnecting register of the target cell.

ADD-S. The result is transferred to the status register of the target cell.

ADD-C. The result is transferred to the command register of the target cell.

Control and Synchronization Trigger: In addition to the result, each cell can generate a quantity of trigger signals. The trigger signals need not necessarily be transferred to the same target cell as the result of processing the configured command. One trigger signal or a combination of multiple trigger signals triggers a certain action in the target cell or puts the cell in a certain state. A description of the states is also to be found in the text below. The following are examples of trigger signals:

GO trigger. The GO trigger puts the target cell in the READY state.

RECONFIG trigger. The RECONFIG trigger puts the target cell in the RECONFIG state, so the cell can be reprogrammed. This trigger is very useful, especially in conjunction with switching tables. If it is assumed that the data to be processed is loaded into the operand register at the rising edge of the clock pulse, processed in the period of the H level and written to the output register at the trailing edge, then the cell can be reconfigured at the trailing edge. The new configuration data is written to the command register at the trailing edge. The period of the L level is sufficient to conclude the reconfiguration successfully.

STEP trigger. The STEP trigger initiates unique execution of the configured command in the target cell in the WAIT state.

STOP trigger. The STOP trigger stops the target cell by putting the cell in the STOP state.

Due to the possibility of indicating in the processing cell into which register of the target cell the result is to be entered and which type of trigger signal is to be generated, a quantity of management data can be generated from a data stream. This management data is not a result of the actual task to be processed by the chip, but instead it serves only the functions of management, synchronization, optimization, etc. of the internal state.

Each cell can assume the following states which are represented by suitable coding in the status register, for example:

READY. The cell is configured with a valid command and can process data. Processing takes place with each clock cycle. The data is entered into the register of the target cell on the basis of the type of addressing of the cell sending the data.

WAIT. The cell has been configured with a valid command and can process data. Processing takes place on the basis of a trigger signal which can be generated by other elements of the module. The data is entered into the register of the target cell on the basis of the type of addressing of the cell sending the data.

CONFIG. This cell is not configured with a valid command. The data package sent to the cell with the next clock cycle is entered into the command register. The data package is entered into the command register in any case, regardless of which type of addressing was used by the cell sending the data.

CONFIG-WAIT. This cell is not configured with a valid command. A data package is entered with the next trigger signal which can be generated by other elements of the module and is written to the command register. The data package is entered into the command register in any case, regardless of which type of addressing was used by the cell sending the data.

RECONFIG. The cell is configured with a valid command, but it does not process any additional data, nor does it accept data. The cell can be reconfigured by another element of the module.

STOP. The cell is configured with a valid command, but it is not processing any data at the moment. The data is accepted by the cell (transferred to the input register) but is not processed further.

Due to these various states and the possibility of read and write access to the various registers of a cell, each cell can assume an active administrative role. In contrast with that, all existing modules of this type have a central management entity which must always know and handle the entire state of the module.

To achieve greater flexibility, there is another class of commands which change types after the first execution. Based on the example of the ADD command, a command is then as follows:

ADD-C-A. The result of the ADD function is written to the command register of the target cell with the first execution of the command. With each additional execution, the result is written to operand register A.

This possibility can be expanded as desired, so that even commands of the type ADD-C-V-A-C- . . . -B are conceivable. Each command can assume all permutated combinations of the various types of addressing and triggers.

Reconfiguration Control by RECONFIG Trigger: In the previous method, each element to be configured received a RECONFIG trigger from an external entity to enter the "reconfigurable" state. This had the disadvantage that distribution of the RECONFIG trigger necessitated a considerable interconnection and configuration expense: Due to the structure of the interconnection, this disadvantage can be eliminated. All configurable elements which are related by the interconnecting information represent a directional graph. Such a graph may have multiple roots (sources) and multiple leaves (targets). The configurable elements are expanded so that they propagate an incoming RECONFIG trigger in the direction of either their outgoing registers, their ingoing registers or a combination thereof. Due to this propagation, all the configurable elements that are directly connected to the configurable element also receive the RECONFIG trigger.

A configuration (graph) can be brought completely into the "reconfigurable" state by sending a RECONFIG trigger to all the roots and propagating the RECONFIG trigger in the direction of the output registers. The quantity of roots in a graph to which a RECONFIG trigger must be sent is considerably smaller than the total quantity of nodes in the graph. This greatly minimizes the complexity. Of course, a RECONFIG trigger may also be sent to all leaves. In this case, the RECONFIG trigger is propagated in the direction of the input registers.

Due to the use of both options or a combination of both methods, a minimum quantity of configurable elements to which a RECONFIG trigger must be sent can be calculated.

The configurable elements can receive an addition record to their status register, indicating whether or not an incoming RECONFIG trigger is to be propagated. This information is needed when two or more different graphs are connected at one or more points (i.e., they have a transition) and it is not desirable for one of the other graphs to enter the "reconfigurable" state. One or more configurable elements thus behave like a lock.

In addition, the status register can be expanded so that an additional entry indicates the direction in which an incoming RECONFIG trigger is to be relayed.

The method described here can be applied to all types of triggers and/or data. In this way, it is possible to establish an automatic distribution hierarchy needing very few access opportunities from the outside to set it in operation.

Implementation of Multiple Functions Simultaneously in the Same Configurable Elements Basic Function and Required Triggers: An especially complex variant of calling up various macros by a condition is presented below: In execution of a condition (IF COMP THEN A ELSE B; where COMP is a comparison, and A and B are operations to be executed), no GO and STOP triggers are generated. Instead, a trigger vector (TRIGV) is generated, indicating to which result the comparison COMP has led. The trigger vector can therefore assume the states "equal," "greater" or "less."

The vector is sent to a following cell which selects exactly a certain configuration register (corresponding to A or B) from a plurality of configuration registers on the basis of the state of the vector. What this achieves is that, depending on the result of the preceding comparison, another function is performed over the data. States such as "greater-equal," "less-equal" and "equal-not equal" are triggered by writing the same configuration data to two configuration registers. For example, with "greater-equal" the configuration register "greater" and the configuration register "equal" are written with the same configuration word, while the configuration register "less" contains another configuration word.

In implementating trigger vectors TRIGV, no restriction to the states "greater," "less" and "equal" is necessary. To analyze large "CASE . . . OF" constructs, any number n representing the state of the CASE may be relayed as trigger vectors TRIGV-m to the downstream cell(s). In other words, n indicates the comparison within the CASE which was correct in analysis of the applied data. For implementation of the function assigned to the comparison within the CASE, n is relayed to the executing cells to select the corresponding function. Although the cells need at least three configuration registers in the "greater/less/equal" case, the number of configuration registers must correspond exactly to at least the maximum value of n (max (n)) when using TRIGV-m.

Propagation of the Required Function by Triggers: TRIGV/TRIGV-m are sent to the first cell processing the data. In this cell, TRIGV/TRIGV-M are analyzed and the data is processed accordingly. TRIGV/TRIGV-m are relayed (propagated) together with the data to the downstream cells. They are propagated to all cells executing a certain function on the basis of the analysis (IF or CASE). Propagation is linked directly to propagation of data packages, i.e., propagation is synchronous with the data. TRIGV/TRIGV-m generated at time t are linked to data present at time t at first processing cells CELLS1 (see FIG. 5: 0502, 0505, 0507). TRIG/TRIG-V are propagated so that the vectors are applied to the second processing cells with the data at time t+1, and at time t+2 they are applied to the third processing cells, etc., until TRIG/TRIG-V and the data are present at time t+m to the $(m-1)^{th}$ cells and at the same time to the last cells which depend on the comparison IF/CASE triggered by TRIG/TRIG-V.

A link is by no means such that the TRIG/TRIG-V generated at time t are linked to data applied to CELLS1 at time $t_{old}$<t.

Reacting to the Presence or Absence of Triggers: In special cases, it is necessary to react to the absence of a trigger, i.e., a trigger state occurs, but no change in trigger vector is initiated. Appropriate and important information can also be transferred to the downstream cells in this case. For example, in a comparison of "greater," "less," "equal," the trigger signal "equal" is not present and does not change when switching from the state "less" to the state "greater." Nevertheless, the absence of "equal" does contain information, namely "not equal."

To be able to react to both states "present" and "not present," an entry in the configuration register of the cell is added, indicating which of the states is to be reacted to.

Furthermore, a signal TRIGRDY indicating the presence of a trigger is added to trigger vector TRIGV representing states "equal," "greater" and "less." This is necessary because the state "not present" on one of the vectors does not provide any more information regarding the presence of a trigger per se.

TRIGRDY can be used as a handshake protocol between the transmitting cell and the receiving cell by having the receiving cell generate a TRIGACK as soon as it has analyzed the trigger vectors. Only after arrival of TRIGACK does the transmitting cell cancel the trigger state.

On the basis of an entry into the configuration register, a determination is made as to whether to wait for receipt of a TRIGACK or whether the trigger channel is to proceed unsynchronized when a trigger vector is sent out.

Use in Microprocessors

In microprocessors of the most recent architecture, conditional jumps are no longer executed by the known method of branch prediction, i.e., prediction of a jump. Speculative prediction of jumps introduced to increase processor performance calculated jumps in advance on the basis of speculative algorithms and had to reload the entire processor pipeline if the calculations were faulty, which led to a considerable loss of power.

To eliminate these losses, the new predicate/NOP method was introduced. A status flag one bit wide is assigned to each command, indicating whether the command is to be executed—or not. There may be any desired quantity of status flags. Commands are assigned to status flags by a compiler during the translation of the code. The status flags are managed by comparison operations assigned to them at the time of execution and indicate the result of the respective comparison.

Depending on the state of a status flag assigned to a command, the command is then executed by the processor (if the status flag indicates "execute") or the command is not executed and is replaced by an NOP (if the status flag indicates "not execute"). NOP stands for "No OPERATION," which means that the processor does not execute any operation in this cycle. Therefore, the cycle is lost for meaningful operations.

Two options are proposed for optimizing the cycle loss:

Multiple Command Registers per Computer Unit: A modern microprocessor has several relatively independent processors.

According to the trigger principle presented here, the individual processors are each equipped with several command registers, with a command register of a processor of a microprocessor being synonymous with a configuration register according to conventional FPGA, DFP, etc. modules. The respective active command register is selected a) on the basis of trigger vectors generated by other processors on the basis of comparisons, b) on the basis of multibit status flags (hereinafter referred to as status vectors) allocated to compare commands according to today's related art method.

Revised VLIW Command Set: One special embodiment is possible through VLIW command sets. Thus, several possible commands depending on one comparison can be combined to give one command within one command word. A VLIW word of any width is subdivided into any desired quantity of commands (codes). Each individual one of these codes is referenced by a trigger vector or a status vector. This means that one of the existing codes is selected from the VLIW word and processed during the running time.

The table illustrates a possible VLIW word with four codes referenced by a 2-bit trigger vector or a 2-bit status flag:

VLIW command word:

| Code 0 | Code 1 | Code 2 | Code 3 |

Assignment:
Trigger vector/status flag:

| 00 | 01 | 10 | 11 |

Expansion of Hardware in Comparison with Conventional FPGAs and DFPs.

Additional Registers: A status register and a configuration register are added to the configuration registers conventionally used in DFPs. Both registers are controlled by the PLU bus and have a connection to the state machine of the sequence control system of the respective cell.

Change in PLU Bus: The configurable registers M-/F-PLUREG in FPGAs and DFPs are managed exclusively over the PLU bus, which represents the connection to the load logic. To guarantee the function according to the present invention, an additional access option must be possible through the normal system bus between the cells. The same thing is true for the new status register and configuration register.

The only part of the system bus relevant for the registers is the part that is interconnected to the PAE over the BM UNIT, go i.e., the interface between the system buses and the PAE. Therefore, the bus is relayed from the BM UNIT to the registers where upstream multiplexers or upstream gates are responsible for switching between the PLU bus and the system bus relevant for the PAE. The multiplexers or gates are switched so that they always switch the system bus relevant for the PAE through, except after resetting the module (RESET) or when the RECONFIG trigger is active.

Expansions of Configurable Elements (PAEs) with Respect to Conventional FPGAs and DFPs: Trigger Sources: A configurable element can receive triggers from several sources at the same time. Due to this possibility, flexible semantics of the triggers can be achieved with the help of masking registers.

Multiple Configuration Registers: Instead of one configuration register, a PAE has multiple (max(n)) configuration registers.

Configuration State Machine and Multiplexer: Downstream from the configuration registers is a multiplexer which selects one of the possible configurations.

The multiplexer is controlled by a separate state machine or a state machine integrated into the PAE state machine, controlling the multiplexer on the basis of incoming trigger vectors.

Trigger Analysis and Configuration: A configurable element may contain a masking register in which it is possible to set the trigger inputs to which a trigger signal must be applied, so that the conditions for an action of the configurable element are met. A configurable element reacts not only to a trigger, but also to a set combination of triggers. In addition, a configurable element can perform prioritization of simultaneously incoming triggers.

Incoming triggers are recognized on the basis of the TRIGRDY signal. The trigger vectors are analyzed here according to configuration data also present in the configuration registers.

Trigger Handshake: As soon as the trigger vectors have been analyzed, a TRIGACK is generated for confirmation of the trigger vector.

BM UNIT: The BM UNIT is expanded so that it relays triggers coming from the bus to the sync unit and SM unit according to the configuration in M-PLUREG. Triggers generated by the EALU (e.g., comparator values "greater," "less," "equal," 0 detectors, plus and minus signs, carryovers, error states (division by 0, etc.), etc.) are relayed from the BM UNIT to the bus according to the wiring information in M-PLUREG.

Expansions of System Bus: The system bus, i.e., the bus system between the cells (PAEs), is expanded so that information is transferred together with the data over the target register. This means that an address which selects the desired register on receipt of the data is also sent. Likewise, the system bus is expanded by the independent transfer of trigger vectors and trigger handshakes.

DETAILED DESCRIPTION OF DIAGRAMS AND EMBODIMENTS

FIG. 1 shows how a loop construct can be implemented by using triggers. In this example, a macro 0103 is to be executed 70 times. One execution of the macro takes 26 clock cycles. This means that counter 0101 may be decremented by one increment only once in every 26 clock cycles. One problem with freely programmable modules is that it is not always possible to guarantee that processing of macro 0103 will actually be concluded after 26 clock cycles. For example, a delay may occur due to the fact that a macro which is to supply the input data for macro 0103 may suddenly require 10 more clock cycles. For this reason, the cell in macro 0103 sends a trigger signal to counter 0101, causing the result of the calculation to be sent to another macro. At the same time, processing of macro 0103 by the same cell is stopped. This cell "knows" exactly that the condition for termination of a calculation has been reached.

In this case the trigger signal sent is a STEP trigger, causing counter 0101 to execute its configured function once. The counter decrements its count by one and compares whether it has reached a value of 0. If this is not the case, a GO trigger is sent to macro 0103. This GO trigger signal causes macro 0103 to resume its function.

This process is repeated until counter 0101 has reached a value of 0. In this case, a trigger signal is sent to macro 0102, where it triggers a function.

A very fine synchronization can be achieved due to this interaction of triggers.

Figure 2:
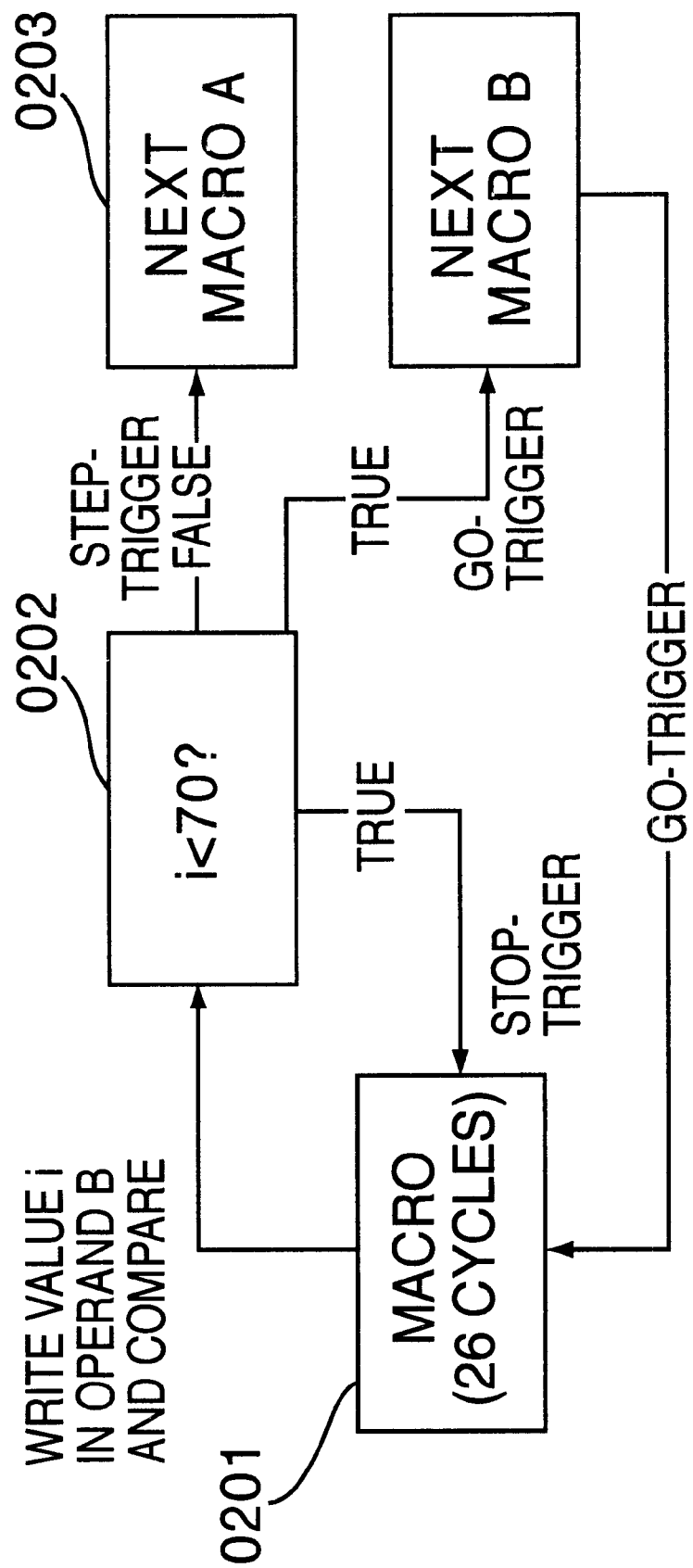
FIG. 2 shows how a comparison construct can be implemented by using multiple triggers, according to an example embodiment of the prep invention.

FIG. 2 shows how a comparison construct can be implemented by using multiple triggers. FIG. 2 corresponds to the basic idea of FIG. 1. However, in this case the function in element 0202 is not a counter but a comparator. Macro 0201 also sends a comparison value to comparator 0202 after each processing run. Depending on the output of the comparison, different triggers are again driven to prompt an action in macros 0203, for example. The construct implemented in FIG. 2 corresponds to that of an IF query in a programming language.

Figure 3:
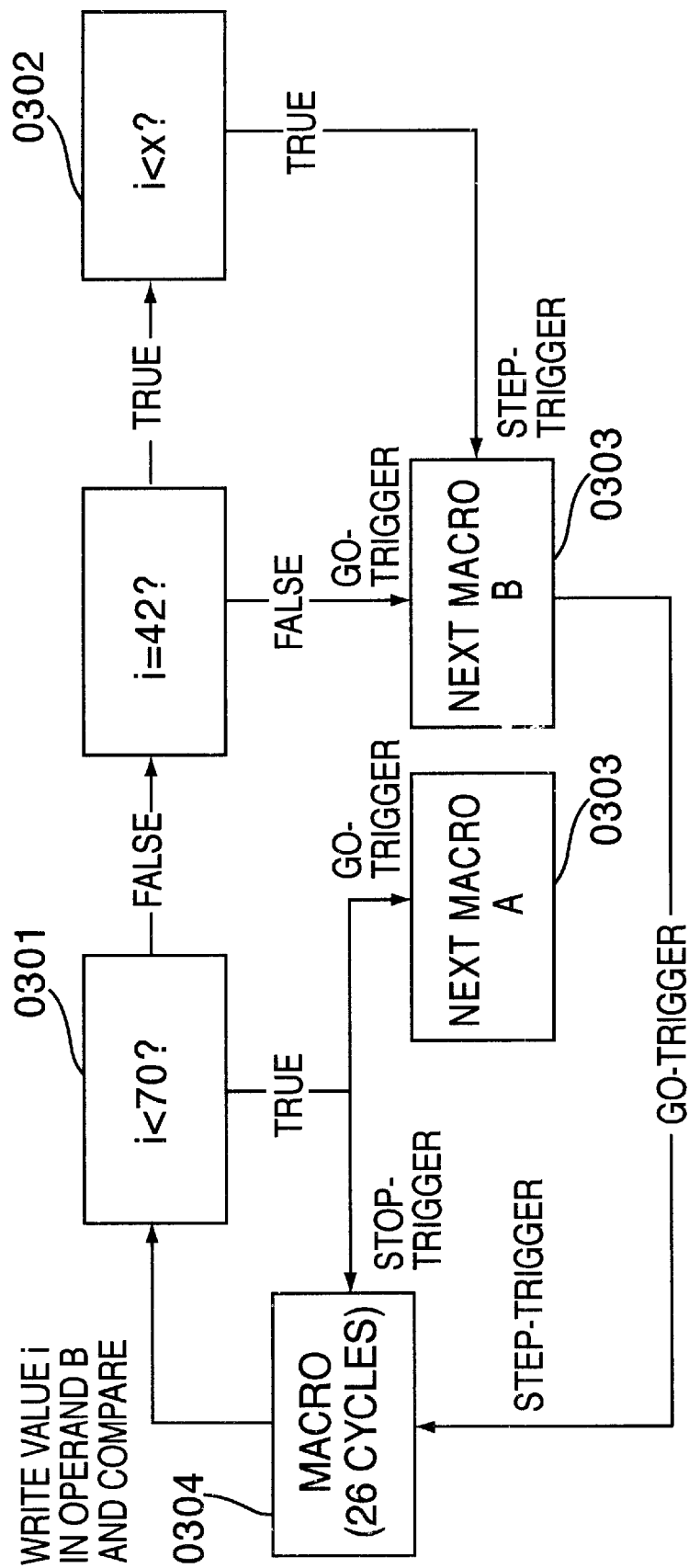
FIG. 3 shows how a comparison construct with multiple outputs can be implemented by using multiple triggers and interleaving them, according to an example embodiment of the present invention.

FIG. 3 shows how a comparison construct with multiple outputs can be implemented by using multiple triggers and interleaving them. Here, as in FIG. 2, several comparators 0301, 0302 are used here to implement construction of an IF-ELSE-ELSE construct (or multiple choice). Due to the use of a wide variety of types of triggers and connections of these triggers to macros 0303, 0304, very complex sequences can be implemented easily.

Figure 4:
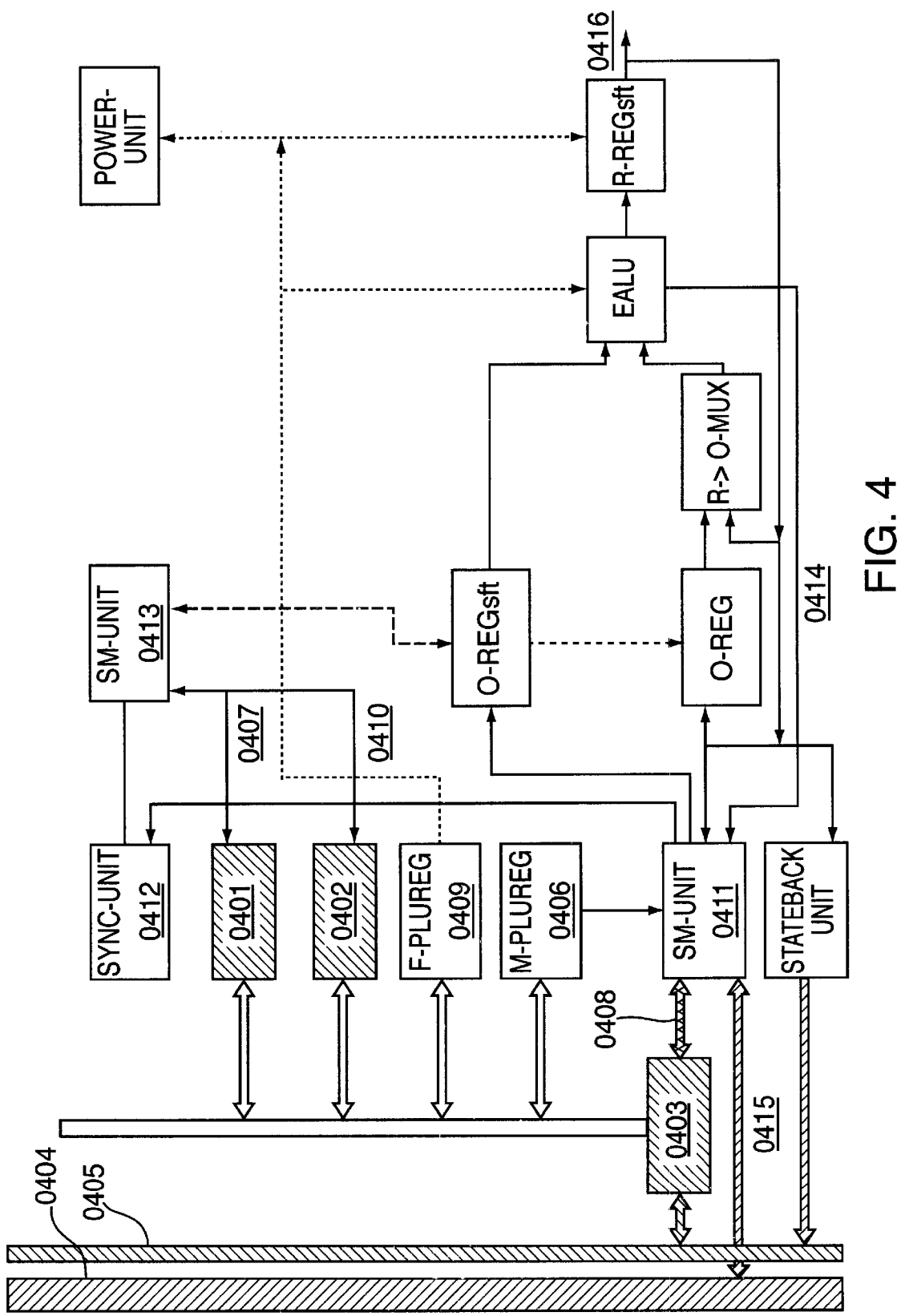
FIG. 4 shows the required expansions, according to an example embodiment of the present invention, in comparison with conventional FPGAs and DFPs.
Figure 5A:
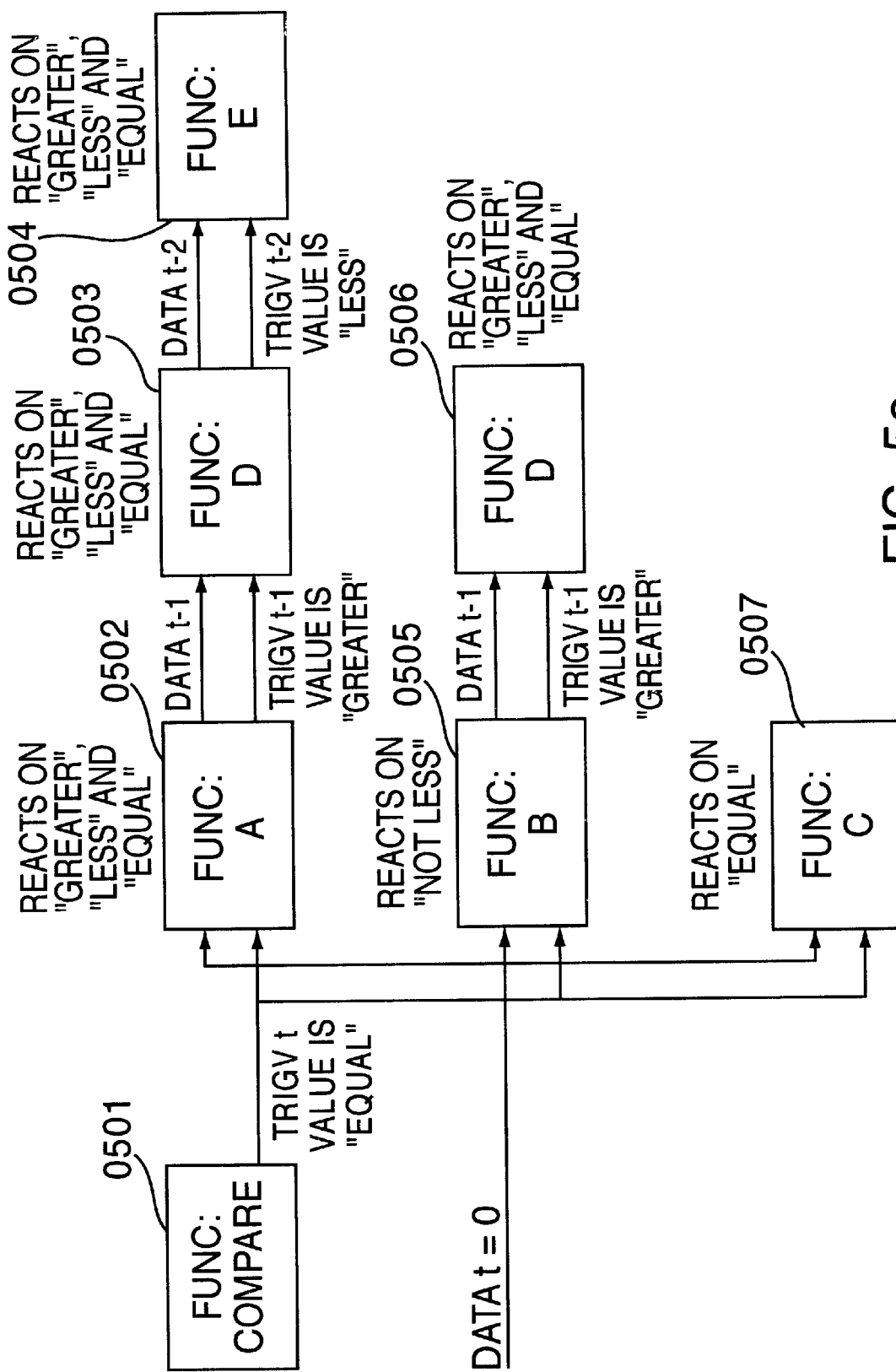
FIGS. 5a–5d show an example of the selection of different functions of the configurable elements by triggers, according to the present invention.
Figure 5B:
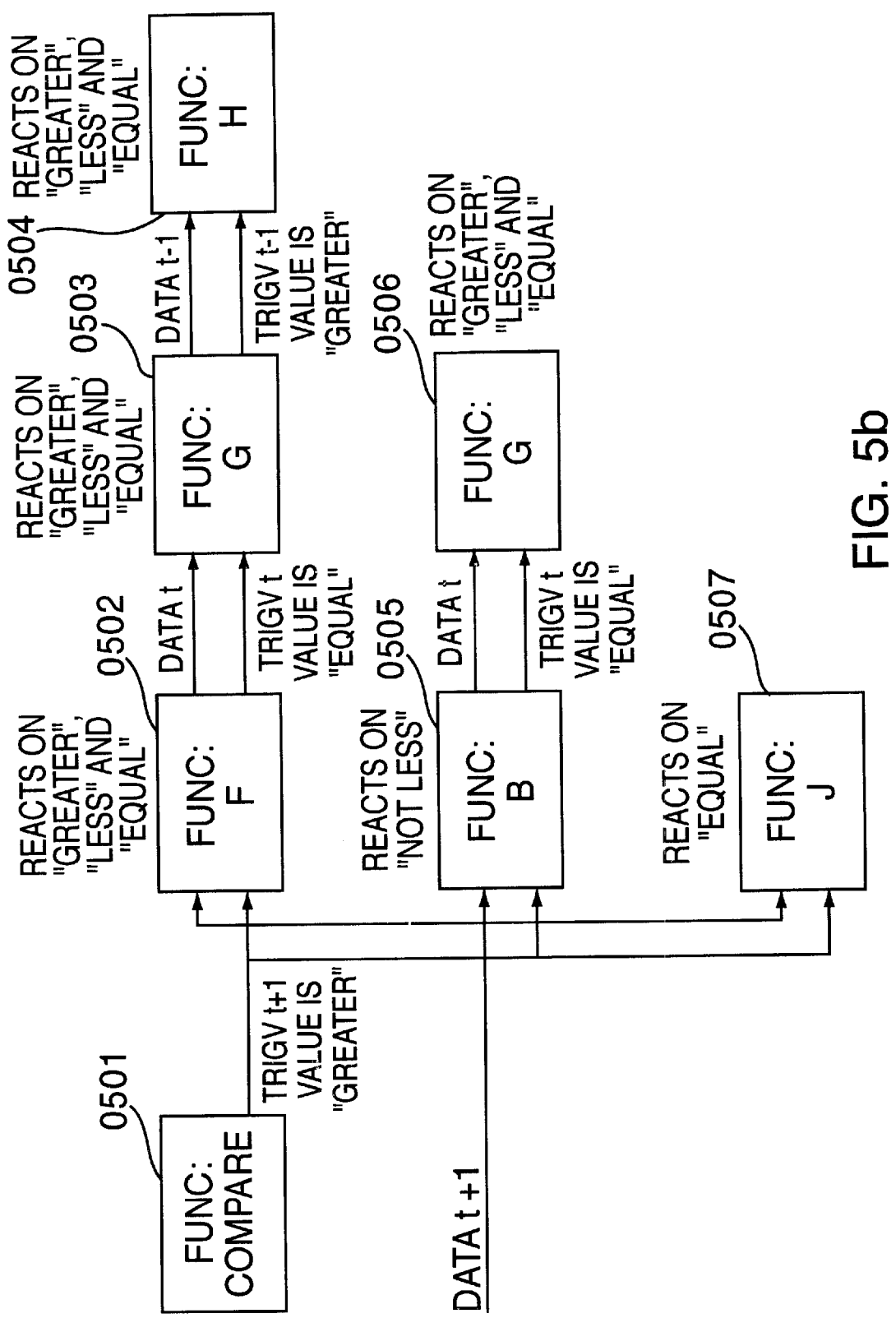
Figure 5C:
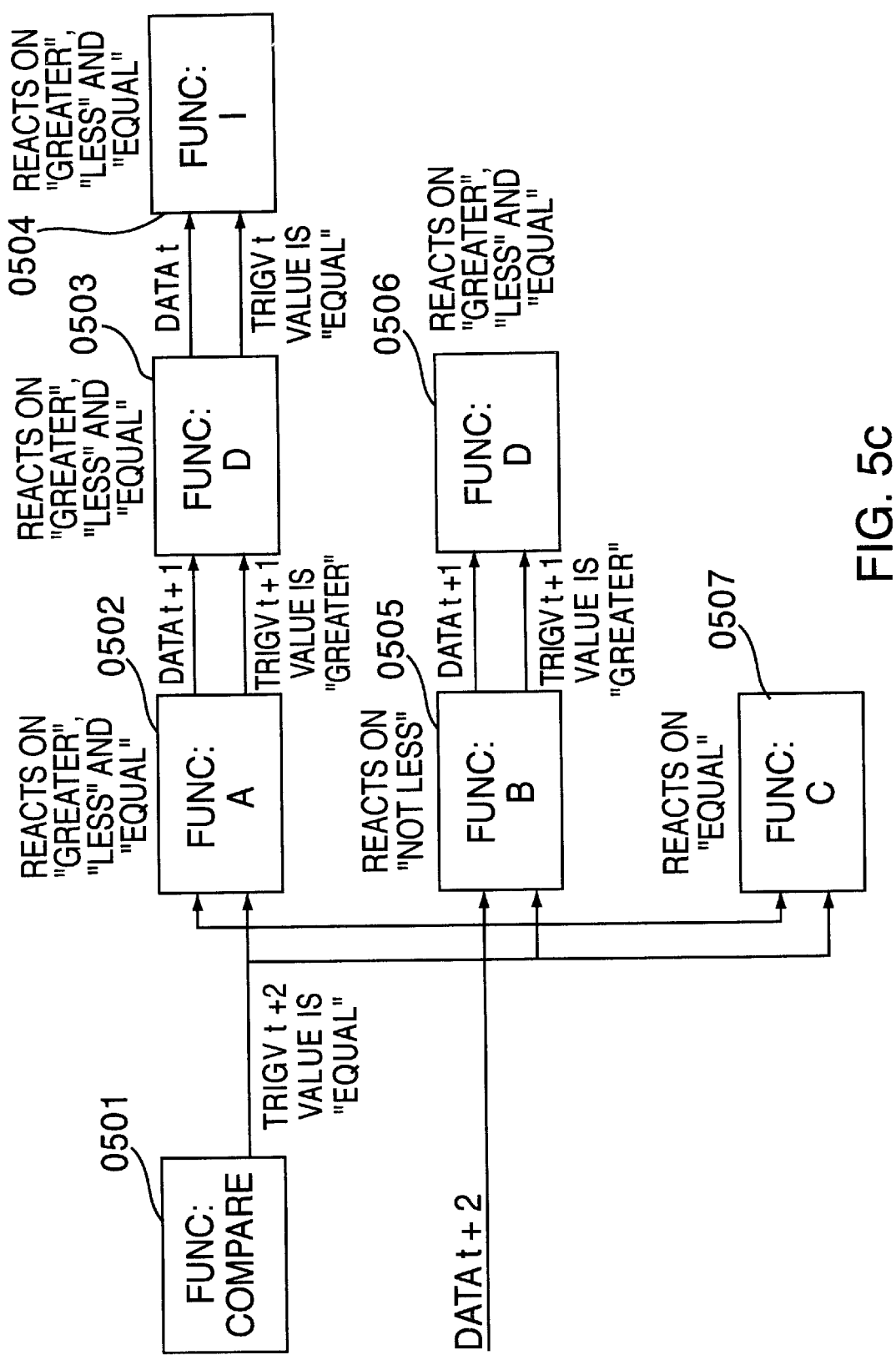
Figure 5D:
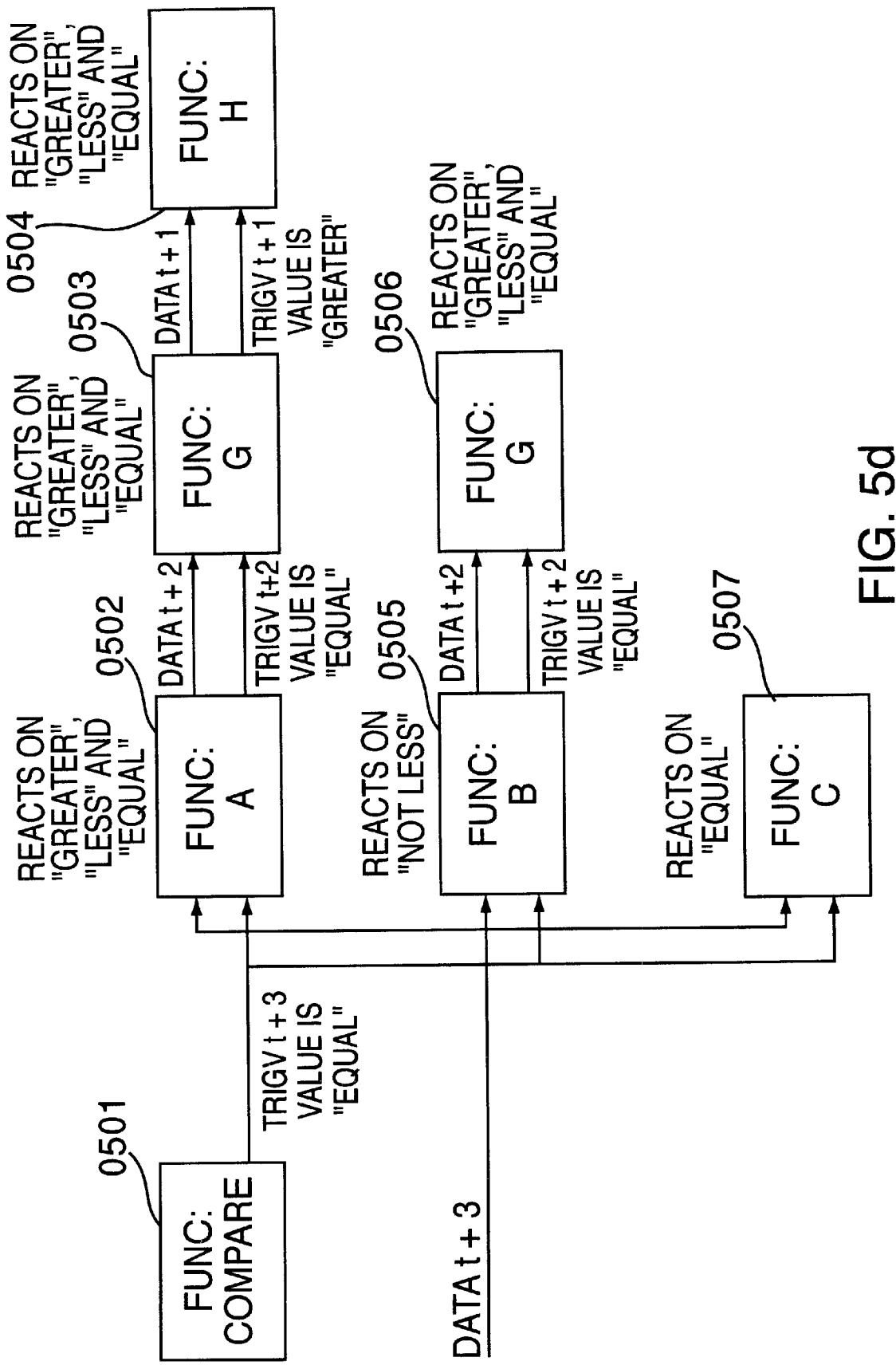

FIG. 4 shows an example of some of the differences between the present invention and, for example, conventional FPGAs and DFPs. Additional configuration register 0401 and additional status register 0402 are connected to the SM UNIT over bus 0407. Registers 0401, 0402, F-PLUREG and M-PLUREG are connected to a gate 0403 by an internal bus 0206. Depending on position, this gate connects internal bus 0406 to PLU bus 0405 to permit configuration by the PLU or to the BM UNIT by a bus 0408. Depending on the address on data bus 0404, the BM UNIT relays the data to the O-REG or to addressed register 0401, 0402, F-PLUREG or M-PLUREG.

BM UNIT 0411 sends trigger signals over 0415 to SYNC UNIT 0412. 0411 receives results from the EALU over 0414 ("equal," "greater," "less," "result=0," "result positive," "result negative," carry-over (positive and negative), etc.) to convert the results into trigger vectors. As an alternative, states generated by the SYNC UNIT or the STATE MACHINE can be relayed to the BM UNIT over 0415.

The trigger signals transmitted by the BM UNIT to bus 0404 can be used there as STEP/STOP/GO triggers, RECONFIG triggers or for selecting a configuration register, depending on the configuration of the configurable elements to be analyzed. Which function a generated trigger will execute in the configurable elements to be analyzed is determined by interconnection 0404 and the configuration of the respective configurable element. One and the same trigger may have different functions with different configurable elements. 0416 is the result output of R-REGsft to bus system 0404 and the following configurable elements.

FIG. 5 shows the time response between generated triggers and the configuration registers selected by the triggers as an example. 0501 generates by comparison a trigger vector TRIGV, which can assume values "equal," "greater," or "less." Configurable elements 0502–0504 process data independently of comparison 0501. Processing depends on comparison values "equal," "greater" and "less." Processing is pipelined, i.e., a data word is modified first by 0502, then by 0503 and finally by 0504. 0505 also processes data as a function of 0501. However, this is limited to the dependence on the comparison values "less"; "greater" and "equal" cause the same function to be carried out. Thus, a distinction is made between the values "less" and "greater than or equal to." 0506 is connected downstream in pipeline 0505. 0506 reacts differently to "equal," "greater" and "less" (see 0503). 0507 also depends on 0501, but a distinction is made between the values "equal" and "not equal (less or greater)." This embodiment begins at time t (FIG. 5a) and ends at time t+3. If the data passes through one of pipelines 0502, 0503, 0504 or 0505, 0506, it is delayed by one clock cycle in each execution in one of macros 0502–0506. Longer and especially different delays may also occur. Since there is a handshake mechanism between the data and trigger signals for automatic synchronization (according to the related art or this application (TRIGACK/TRIGRDY)), this case need not be discussed separately.

Due to the delays, data and trigger signals of the earlier time t−2 are available at time t between the second and third pipeline steps, for example.

FIGS. 5a through 5d show the sequence of three clock cycles t through t+2.

The trigger vectors (i.e., the results of the comparison) generated by 0501 look as follows over t:

| Time t | Result of comparison |
|---|---|
| t − 2 | less |
| t − 1 | greater |
| t | equal |
| t + 1 | greater |
| t + 2 | equal |

Figure 6:
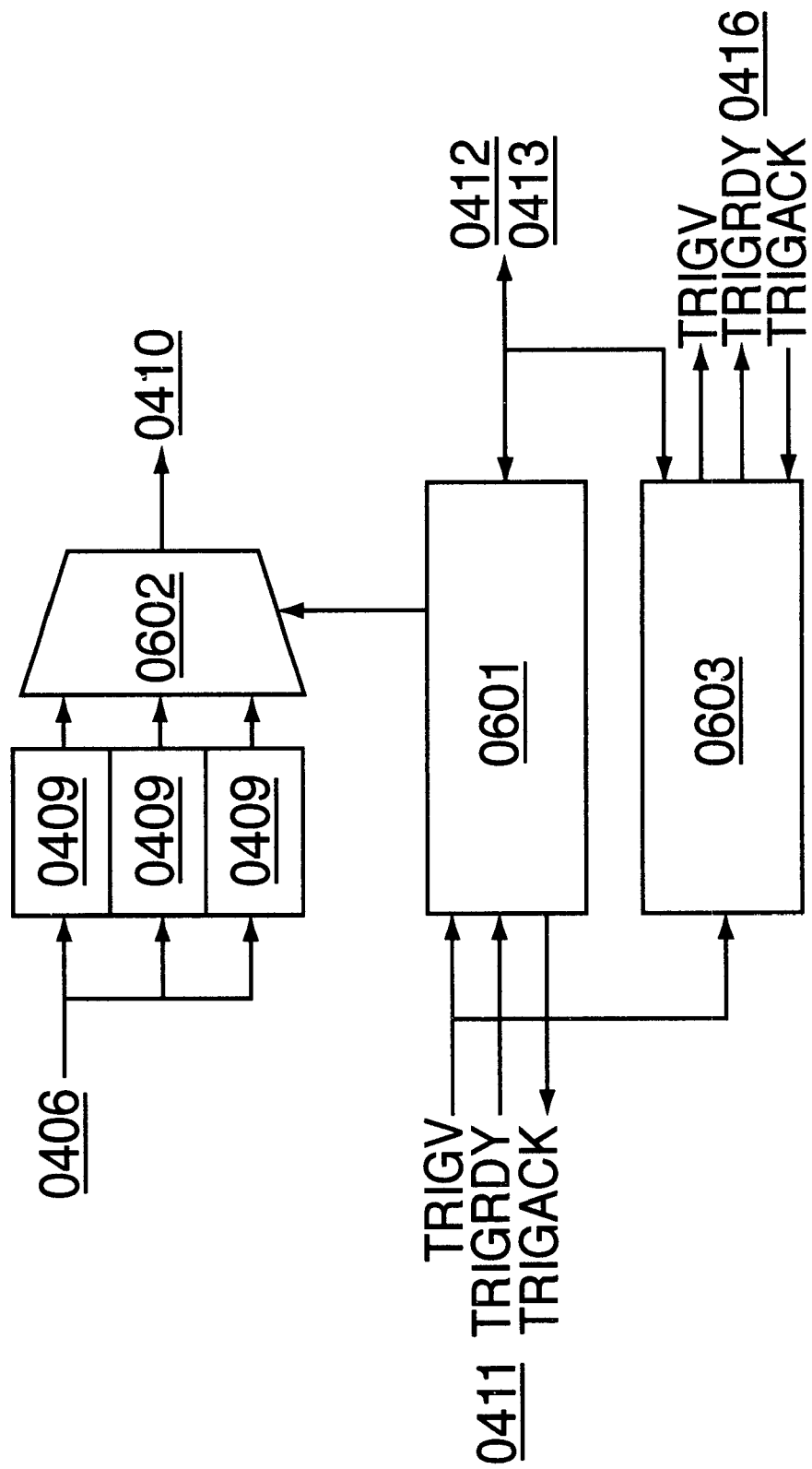
FIGS. 6 and 6a show an implementation of multiple configuration registers controlled by triggers for executing different functions, according to an example embodiment of the present invention.

FIG. 6 shows the integration of several configuration registers into one configurable element. In this embodiment there are three configuration registers 0409 according to FIG. 4. These are configured over bus 0406. A control unit 0601 (which may also be designed as a state machine) receives signals TRIGV and TRIGRDY over bus system 0411. Depending on TRIGV, the control unit switches one of the configuration registers over multiplexer 0602 to bus system 0401 leading to the control mechanisms of the configurable element. For synchronization of the trigger signals with the internal sequences of the configurable element, 0601 has a synchronization output leading to synchronization unit 0412 or to state machine 0413. For synchronization of the trigger sources, 0601 generates handshake signal TRIGACK after processing the incoming trigger. In this embodiment, each configuration register 0409 is assigned to one TRIGV of the type "equal," "greater" "less." If other operations are executed with each type of trigger, then each configuration register is occupied differently. For example, if a distinction is made only between "equal" and "not equal" then the configuration registers are occupied equally for the types "less" and "greater," namely with the configuration for "not equal." The configuration register for "equal" is occupied differently. This means that the comparison can be made more specific on the basis of the occupancy of the configuration registers, each configurable element being able to design this specification differently.

TRIGV is relayed together with the result over register 0603 to the downstream configurable elements to permit pipelining according to FIGS. 5a–d. The register and the handshake signals are controlled by 0412 or 0413. Trigger information together with the result from R-REGsft or with a time offset, i.e., before the result, can be sent over interface 0416 to downstream configurable elements.

Figure 6A:
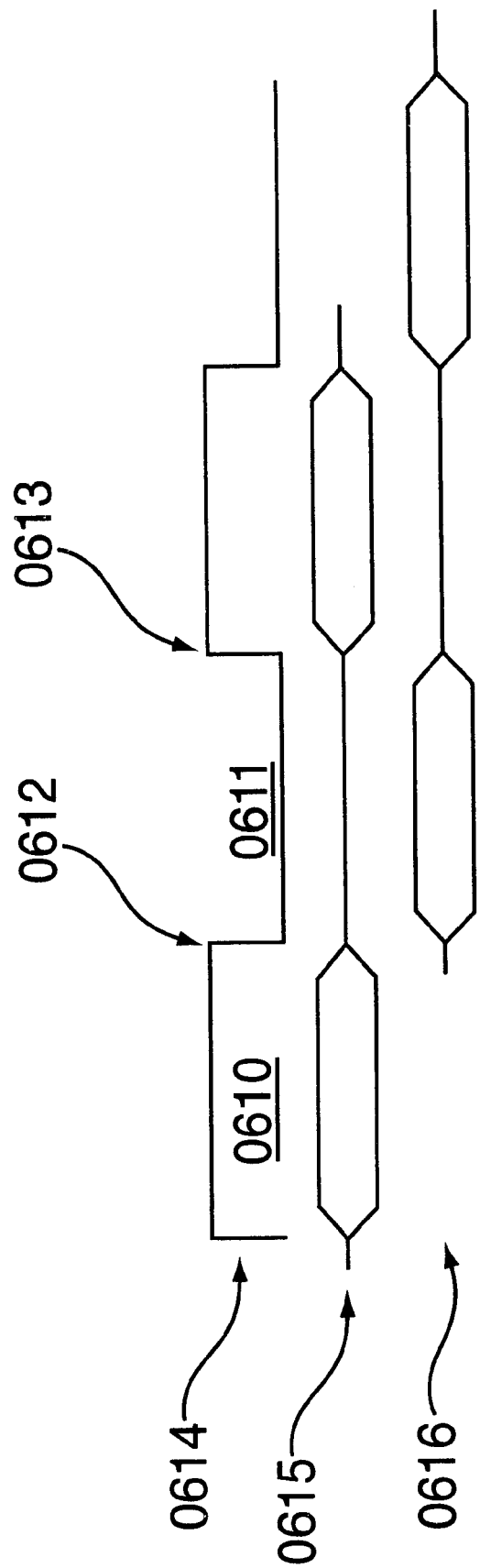

A time-offset transfer offers the advantage that no additional time is necessary for setting the configuration registers in the downstream configurable elements, because the setting is made before receiving the data (simultaneously with the release of the result). FIG. 6a shows a corresponding timing (based on sequences conventional for DFP). Trigger vectors 0615 are generated at rising edge 0613 of module clock 0614. Triggers are analyzed in the configurable elements at trailing edge 0612. Data is phase shifted, i.e., released at 0612 and entered at 0613. The trigger vectors are transferred over the bus and data is calculated during 0610. Data is transferred over the bus and triggers are calculated during 0611, or configuration registers of the configurable elements are selected according to data stored at 0613 and the configuration is set accordingly.

Figure 7B:
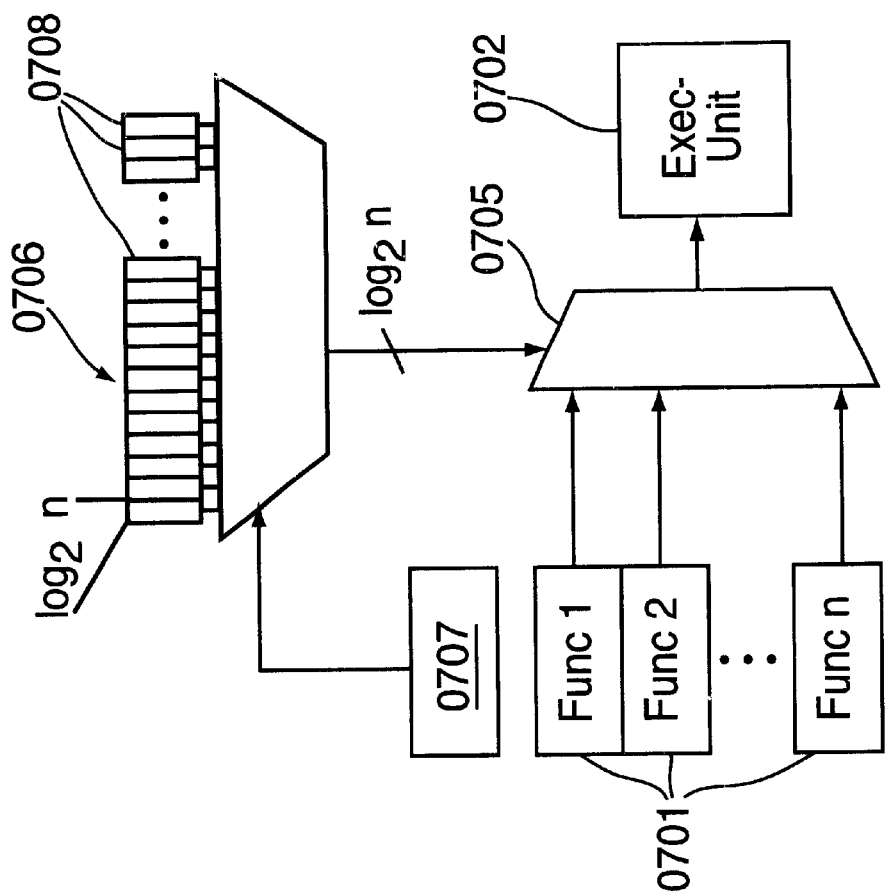
FIGS. 7a and 7b shows an implementation of the method from FIG. 6 in microprocessors, according to an example embodiment of the present invention.
Figure 7A:
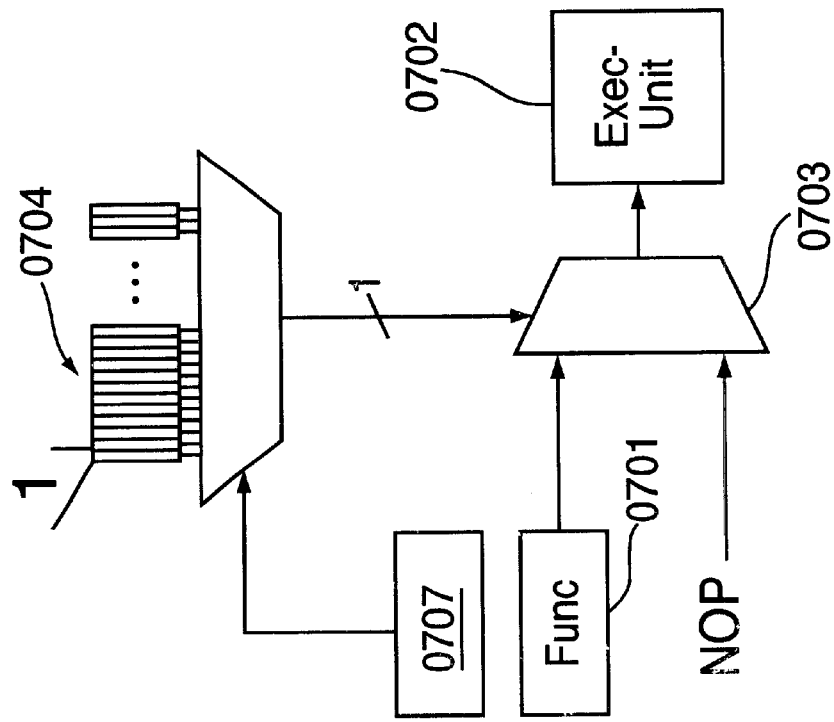

FIG. 7a shows the management of jumps according to the predicate/NOP method of the related art. In execution of a comparison, an entry is made in predicate register 0704. This entry is queried during the execution of commands, determining whether a command is being executed (the command is inside the code sequence addressed by the conditional jump) or is replaced by an NOP (the command is in a different code sequence from that addressed by the conditional jump). The command is in command register 0701. The predicate register contains a plurality of entries allocated to a plurality of operations and/or a plurality of processors. This allocation is issued at the compile time of the program of the compiler. Allocation information 0707 is allocated to the command entered into the command register, so that a unique entry is referenced by the respective command.

0703 selects whether the command from 0701 or an NOP is to be executed. In execution of an NOP, one clock cycle is lost. 0703 has a symbolic character, because executing unit 0702 could also in principle be controlled directly by 0704.

In FIG. 7b there are n command registers (0701: Func 1 ... Func n). In executing a comparison/conditional jump, the command register to be addressed, i.e., the result of the comparison, is deposited as an entry 0708 in predicate register 0706, where 0706 has a plurality of such entries. Respective entry 0708 in 0706 is so wide that all possible command registers of an executing unit 0702 can be addressed by it, which means that the width of an entry is $\log_2(n)$ with n command registers. The predicate register contains a plurality of entries allocated to a plurality of operations and/or a plurality of processors. This allocation is issued by the compiler at the compile time of the program. Allocation information 0707 is allocated to the quantity of commands entered into the command registers, so that an unambiguous entry is referenced by the respective commands.

The multiplexer selects which command register supplies the code for the instantaneous execution.

Due to this technology, a valid command is executed instead of an NOP even in the worst case with conditional jumps, so no clock cycle is wasted.

The following provides an explanation of various names, functions and terms described above.

Name Convention

| | |
|---|---|
| Assembly group | -UNIT |
| Type of operation | -MODE |
| Multiplexer | -MUX |
| Negated signal | not- |
| Register for PLU visible | -PLUREG |
| Register internal | -REG |
| Shift register | -sft |

Function Convention

NOT function!

| I | Q |
|---|---|
| 0 | 1 |
| 1 | 0 |

AND function &

| A | B | Q |
|---|---|---|
| 0 | 0 | 0 |
| 0 | 1 | 0 |
| 1 | 0 | 0 |
| 1 | 1 | 1 |

OR function #

| A | B | Q |
|---|---|---|
| 0 | 0 | 0 |
| 0 | 1 | 1 |
| 1 | 0 | 1 |
| 1 | 1 | 1 |

GATE function G

| EN | B | Q |
|---|---|---|
| 0 | 0 | – |
| 0 | 1 | – |
| 1 | 0 | 0 |
| 1 | 1 | 1 |

Definition of Terms

BM UNIT: Unit for switching data to the bus systems outside the PAE. Switching is done over multiplexers for the data inputs and gates for the data outputs. oACK lines are implemented as open collector drivers. The BM UNIT is controlled by the M-PLUREG.

Data receiver: The unit(s) that process(es) the results of the PAE further.

Data transmitter: The unit(s) that make(s) available the data for the PAE as operands.

Data word: A data word consists of a bit series of any desired length. This bit series represents a processing unit for a system. Commands for processors or similar modules as well as pure data can be coded in a data word.

DFP: Data flow processor according to German Patent/Unexamined Patent No. 44 16 881.

DPGA: Dynamically configurable FPGAs. Related art.

EALU: Expanded arithmetic logic unit. ALU which has been expanded by special functions which are needed or appropriate for operation of a data processing system according to German Patent No. 441 16 881 A1. These are counters in particular.

Elements: Collective term for all types of self-contained units which can be used as part of an electronic module. Elements thus include:
  configurable cells of all types
  clusters
  blocks of RAM
  logic
  processors
  registers
  multiplexers
  I/O pins of a chip Event: An event can be analyzed by a hardware element of any type suitable for use and can prompt a conditional action as a reaction to this analysis. Events thus include, for example:

clock cycle of a computer internal or external interrupt signal trigger signal from other elements within the module comparison of a data stream and/or a command stream with a value input/output events sequencing, carry-over, reset, etc. of a counter analysis of a comparison FPGA: Programmable logic module. Related art.

F-PLUREG: Register in which the function of the PAE is set. Likewise, the one shot and sleep mode are also set. The register is written by the PLU.

H level: Logic 1 level, depending on the technology used.

Configurable element: A configurable element is a unit of a logic module which can be set for a special function by a configuration word. Configurable elements are thus all types of RAM cells, multiplexers, arithmetic logic units, registers and all types of internal and external network writing, etc.

Configurable cell: See logic cells.

Configure: Setting the function and interconnecting a logic unit, an (FPGA) cell or a PAE (see: Reconfigure).

Configuration data: Any quantity of configuration words.

Configuration memory: The configuration memory contains one or more configuration words.

Configuration word: A configuration word consists of a bit series of any desired length. This bit series represents a valid setting for the element to be configured, so that a functional unit is obtained.

Load logic: Unit for configuring and reconfiguring the PAE. Embodied by a microcontroller specifically adapted to its function.

Logic cells: Configurable cells used in DFPs, FPGAs, DPGAs, fulfilling simple logic or arithmetic functions according to their configuration.

L level: Logic 0 level, depending on the technology used.

M-PLUREG: Register in which the interconnection of the PAE is set. The register is written by the PLU.

O-REG: Operand register for storing the operands of the EALU. Permits independence of the PAE of the data transmitters in time and function. This simplifies the transfer of data because it can take place in an asynchronous or package-oriented manner. At the same time, the possibility of reconfiguring the data transmitters independently of the PAE or reconfiguring the PAE independently of the data transmitters is created.

PLU: Unit for configuring and reconfiguring the PAE. Embodied by a microcontroller specifically adapted to its function.

Propagate: Controlled relaying of a received signal.

RECONFIG: Reconfigurable state of a PAE.

RECONFIG trigger: Setting a PAE in the reconfigurable state.

SM UNIT: State machine UNIT. State machine controlling the EALU.

Switching table: A switching table is a ring memory which is addressed by a control. The entries in a switching table may accommodate any desired configuration words. The control can execute commands. The switching table reacts to trigger signals and reconfigures configurable elements on the basis of an entry in a ring memory.

Synchronization signals: Status signals generated by a configurable element or a processor and relayed to other configurable elements or processors to control and synchronize the data processing. It is also possible to return a synchronization signal with a time lag (stored) to one and the same configurable element or processor.

TRIGACK/TRIGRDY: Handshake of the triggers.

Trigger: Synonymous with synchronization signals.

Reconfigure: Configuring any desired quantity of PAEs again while any desired remaining quantity of PAEs continue their own function (see: Configure).

Processing cycle: A processing cycle describes the period of time needed by a unit to go from one defined and/or valid state into the next defined and/or valid state.

VLIW: Very large instruction word. Coding of microprocessors, prior art method.

Cells: Synonymous with configurable elements.

What is claimed is:

1. A method for synchronization of data processing sequence control in a system with a plurality of configurable elements arranged in a programmable cell structure, comprising:

generating a synchronization signal during processing by a first configurable processing element;

sending the synchronization signal to a second configurable processing element over a bus system; and synchronizing data processing in the second configurable processing element using the synchronization signal.

2. The method of claim 1, wherein the synchronization signal is generated as a result of a comparison of data made by the first processing element.

3. The method of claim 1, wherein the synchronization signal is generated as a result of carry-over of an arithmetic operation performed by the first processing element.

4. The method according to claim 1, further comprising:

controlling the sequence of data processing in the second processing element as a function of a type of the synchronization signal which is received by the second configurable processing element.

5. The method according to claim 1, further comprising:

prompting the second configurable processing element to execute only a single operation.

6. The method according to claim 1, further comprising:

prompting the second configurable processing element to freely execute a plurality of operations.

7. The method according to claim 1, further comprising:

stopping the execution of the second configurable processing element upon receipt of the synchronization signal.

8. The method according to claim 1, further comprising:

upon receipt of the synchronization signal, placing the second configurable processing element in a state that allows reconfiguration of the second configurable processing element.

9. The method according to claim 1, further comprising:

indicating the status of the second configurable element in a status register.

10. The method according to claim 1, further comprising:

sending computation output data from the first processor to the second processor.

11. The method according to claim 1, further comprising:

sending computational output data from the first processor to a third processor that does not receive the synchronization signal.

12. The method according to claim 1, further comprising:
blocking the transfer of synchronization signals to the second configurable processing element.

13. The method according to claim 1, further comprising:
blocking the transfer of synchronization signals from the first configurable processing element.

14. The method according to claim 1, further comprising:
selecting a type for the synchronization signal from a plurality of signal types;
determining the effect of the synchronization signal on the second processor as a function of the type.

15. The method according to claim 1, further comprising:
broadcasting the synchronization signal to a plurality of configurable processing elements.

16. The method according to claim 1, further comprising:
acknowledging receipt of the synchronization signal.

17. The method according to claim 16, further comprising:
allocating an acknowledge line to the synchronization signal, and wherein
the acknowledging receipt of the synchronization signal includes transmitting a signal via the acknowledge line.

18. The method of claim 1, further comprising:
maintaining a counter with the first processing element, wherein the synchronization signal is generated when the counter satisfies a predetermined condition.

19. The method of claim 18, wherein
the predetermined condition is satisfied when the counter changes sign.

20. The method of claim 18, wherein
the predetermined condition is satisfied when the counter overflows.

21. The method according to claim 1, further comprising:
generating a synchronization vector comprising a plurality of synchronization signals;
transmitting the synchronization vector from the first configurable processing element to the second configurable processing element.

22. The method according to claim 21, further comprising:
selecting a configuration register for the second configurable processing element from a plurality of configuration registers, the selected configuration register being selected as a function of the synchronization vector.

23. The method according to claim 21, further comprising:
selecting a command register for the second configurable processing element from a plurality of command registers, the selected command register being selected as a function of the synchronization vector.

24. A method of synchronization for a data processing system having configurable elements in a programmable cell structure, comprising:
generating configuration words within a first configurable element;
transferring the configuration words and a register address to a second configurable element; and
writing the configuration words into a register indicated by the register address.

25. The method of claim 24, further comprising,
indicating the status of the second configurable element by writing information to a status register.

26. The method of claim 24, further comprising:
coding the register address as part of a command; and
transferring the command from the first configurable element to the second configurable element over a data bus.

27. A method for synchronization of data processing sequence control in a system with a plurality of configurable elements arranged in a programmable cell structure, comprising:
sending a synchronization signal from a first configurable processing element to a second configurable processing element;
selecting a configuration for the second configurable processing element from a plurality of configurations, the configuration being chosen as a function of the synchronization signal;
sending a second synchronization signal from the first configurable processing element to the second configurable processing element;
choosing a command from a plurality of possible command, the command being chosen as a function of the second synchronization signal;
executing the command with the second configurable processing element.

28. The method of claim 27, further comprising:
indicating the status of the second configurable processing element by storing a value in a status register.

29. The method of claim 27, further comprising:
sending processing data from the first configurable processing element to the second configurable processing element.

30. The method of claim 27, further comprising:
sending processing data from the second configurable processing element to the first configurable processing element.

31. The method of claim 27, further comprising:
blocking the sending of the synchronization signal to the second configurable processing element.

32. The method of claim 27, wherein
the synchronization signal is sent when an error condition occurs in the first configurable processing element.

33. The method of claim 27, wherein
the synchronization signal is sent when a comparison operation performed by the first configurable processing element yields a predetermined result.

34. The method of claim 27, wherein
the synchronization signal is multicast to a plurality of configurable processing elements.

35. The method of claim 27, further comprising:
allocating an acknowledge line to the synchronization signal.

36. The method of claim 27, further comprising:
sending processing data from the first configurable processing element to a third configurable processing element.

37. The method of claim 36, wherein
the processing data is sent from the first configurable processing element to the third configurable processing element at the same time that synchronization signal is sent from the first configurable processing element to the second configurable processing element.

38. The method of claim 27, wherein
the synchronization signal is part of a synchronization vector comprising a plurality of synchronization signals.

39. The method of claim 38, further comprising:
storing a value for the synchronization signal in a register allocated to an operation.

* * * * *